United States Patent
Vaccaro

(10) Patent No.: US 9,667,054 B2
(45) Date of Patent: May 30, 2017

(54) ADAPTER FOR SEALING COVER FOR ELECTRICAL INTERCONNECTIONS

(71) Applicant: CommScope Technologies LLC, Hickory, NC (US)

(72) Inventor: Ronald A. Vaccaro, Shorewood, IL (US)

(73) Assignee: CommScope Technologies LLC, Hickory, NC (US)

( * ) Notice: Subject to any disclaimer, the term of this patent is extended or adjusted under 35 U.S.C. 154(b) by 135 days.

(21) Appl. No.: 14/572,572

(22) Filed: Dec. 16, 2014

(65) Prior Publication Data

US 2016/0172836 A1   Jun. 16, 2016

(51) Int. Cl.
*H02G 15/04*   (2006.01)

(52) U.S. Cl.
CPC ................. *H02G 15/046* (2013.01)

(58) Field of Classification Search
CPC ...... H02G 15/04; H02G 15/025; H02G 15/02; H02G 15/013; H02G 1/14; H01B 11/18; H01R 9/05
See application file for complete search history.

(56) References Cited

U.S. PATENT DOCUMENTS

| | | |
|---|---|---|
| 7,311,554 B1 | 12/2007 | Jackson et al. |
| 9,166,348 B2 | 10/2015 | Burris et al. |
| 2004/0245730 A1* | 12/2004 | Holland ................ F16L 37/138 277/602 |
| 2010/0248533 A1 | 9/2010 | Montena |
| 2012/0100738 A1* | 4/2012 | Palinkas ............. H02G 15/013 439/277 |
| 2014/0097022 A1 | 4/2014 | Vaccaro |

OTHER PUBLICATIONS

International Search Report and Written Opinion for corresponding PCT Application No. PCT/US2015/065498, date of mailing Jun. 3, 2016, 12 pages.

* cited by examiner

*Primary Examiner* — Timothy Thompson
*Assistant Examiner* — Amol Patel
(74) *Attorney, Agent, or Firm* — Myers Bigel, P.A.

(57) ABSTRACT

An assembly includes: a threaded stem having an external helical male thread, the male thread defining a root having a first diameter, a crest having a second diameter, and flanks defining a third diameter; and a sealing adapter having an annular body, an outer surface, and an internal female thread, the female thread defining a crest having a fourth diameter, a root having a fifth diameter, and flanks defining a sixth diameter. The sealing adapter is threaded onto the threaded stem such that the female thread engages the male thread. Prior to assembly, the fourth diameter is less than the first diameter, the fifth diameter is less than the second diameter, and the sixth diameter is less than the third diameter.

20 Claims, 2 Drawing Sheets

ADAPTER FOR SEALING COVER FOR ELECTRICAL INTERCONNECTIONS

FIELD OF THE INVENTION

The invention relates generally to a device for environmentally sealing and securing the interconnection between electrical cables.

BACKGROUND

Electrical interconnections, such as the interconnection between two cables or a cable and a piece of electronic equipment, may be subject to degradation from environmental factors such as moisture, vibration and repeated expansion and contraction from daily temperature changes. Outer sealing enclosures that surround or enclose an electrical interconnection have been used to protect such interconnections. Enclosures often apply rigid clamshell configurations that, once closed, may be difficult to open, especially when installed in exposed or remote locations, such as atop radio towers; gaskets or gel seals may be applied at the enclosure ends and/or along a sealing perimeter of the shell.

Elastic interconnection seals are also known. Elastic seals can be advantageous by virtue of being more easily installed over the typically uneven contours of an electrical interconnection. Exemplary configurations are described in U.S. patent application Ser. No. 13/646,952, filed Oct. 8, 2012, and Ser. No. 13/938,475, filed Jul. 10, 2013, the disclosures of each of which are hereby incorporated by reference herein.

SUMMARY

As a first aspect, embodiments of the invention are directed to an assembly, comprising: a threaded stem having an external helical male thread, the male thread defining a root having a first diameter, a crest having a second diameter, and flanks defining a third diameter; and a sealing adapter having an annular body, an outer surface, and an internal female thread, the female thread defining a crest having a fourth diameter, a root having a fifth diameter, and flanks defining a sixth diameter. The sealing adapter is threaded onto the threaded stem such that the female thread engages the male thread. Prior to assembly, the fourth diameter is less than the first diameter, the fifth diameter is less than the second diameter, and the sixth diameter is less than the third diameter.

As a second aspect, embodiments of the invention are directed to an assembly, comprising: a threaded stem having an external helical male thread, the male thread defining a root having a first diameter, a crest having a second diameter, and flanks defining a third diameter; and a sealing adapter having an annular body, an outer surface, and an internal female thread, the female thread defining a crest having a fourth diameter, a root having a fifth diameter, and flanks defining a sixth diameter. The sealing adapter is threaded onto the threaded stem such that the female thread engages the male thread. The first, second, third, fourth, fifth and sixth diameters are selected so that the sealing adapter forms a watertight seal with the threaded stem.

As a third aspect, embodiments of the invention are directed to an assembly, comprising: a threaded stem having an external helical male thread, the male thread defining a root having a first diameter, a crest having a second diameter, and flanks defining a third diameter; and a sealing adapter having an annular body, an outer surface, and an internal female thread, the female thread defining a crest having a fourth diameter, a root having a fifth diameter, and flanks defining a sixth diameter. The sealing adapter is threaded onto the threaded stem such that the female thread engages the male thread. The first, second, third, fourth, fifth and sixth diameters are selected so that the male thread of the threaded stem and the female thread of the sealing adapter experience full compressive contact.

DETAILED DESCRIPTION OF EMBODIMENTS OF THE INVENTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used herein is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to the figures, exemplary mounting structures for attachment of an electrical cable are shown in FIGS. 1-3C. The mounting structures 10 (in FIGS. 2-3B) and 10' (in FIGS. 1 and 1A) may be any mounting structure having an electrical connector with a threaded stem 12, 12' to which an electrical cable can be attached via a mating connector. As examples, the mounting structures 10, 10' may be an antenna, RRH, or the like.

Figure 1A:
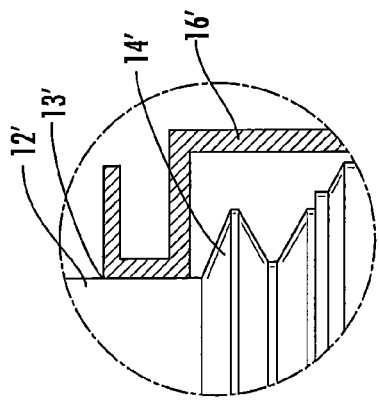
FIG. 1A is a top view of an enlarged section of the threaded stem of FIG. 1 with a sealing boot applied.
Figure 2A:
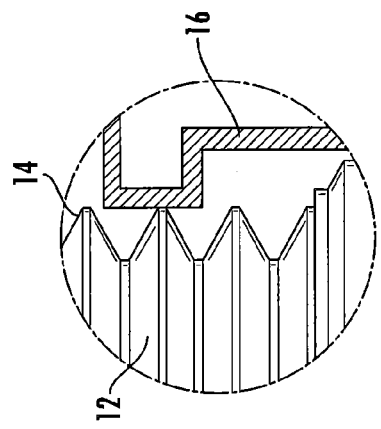
FIG. 2A is a top view of an enlarged section of the threaded stem of FIG. 2 with a sealing boot applied.
Figure 1:
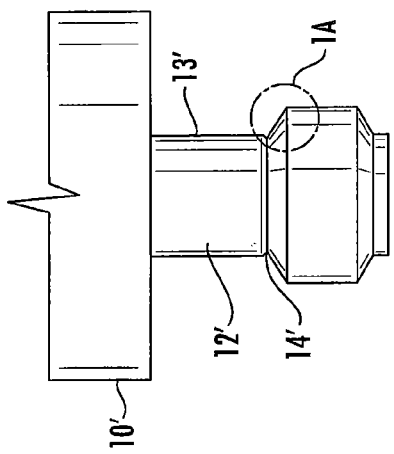
FIG. 1 is a top view of an antenna, remote radio head (RRH) or other mounting structure with a threaded stem for electrical connection.
Figure 2:
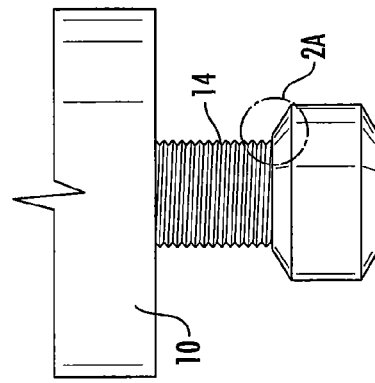
FIG. 2 is a top view of an alternative mounting structure with a threaded stem with threads along most or all of its length.

The mounting structure 10' includes a threaded stem 12' that has a smooth surface 13' adjacent the bulkhead of the mounting structure 10' and a threaded surface 14' on its free end (see FIG. 1A). The smooth surface 13' provides a surface appropriate for sealing with a sealing boot 16' or the like. In contrast, the mounting structure 10 of FIGS. 2 and 2A includes a threaded stem 12 that has a predominantly, if not entirely, threaded surface 14. As can be seen in FIG. 2A, the sealing boot 16 (which is typically formed of an elastomeric material such as rubber) contacts the threads of the threaded surface 14, which can create voids in the engagement between the sealing boot 16 and the stem 12 through which water and other environmental agents can seep.

Figure 3:
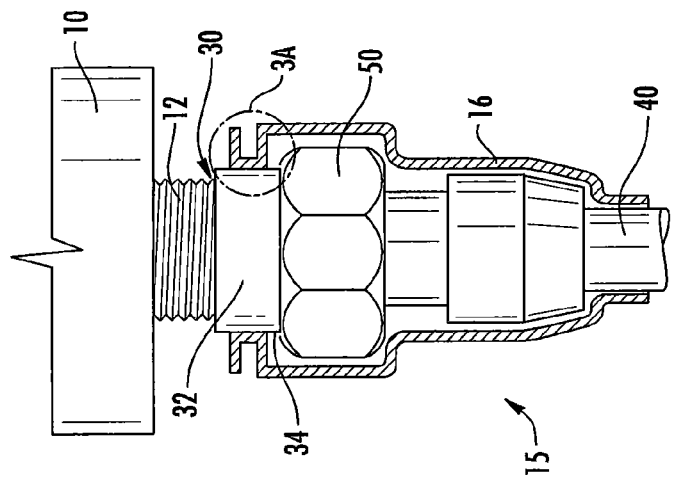
FIG. 3 is a top view of the mounting structure of FIG. 2 including a sealing adapter in accordance with embodiments of the present invention.
Figure 3A:
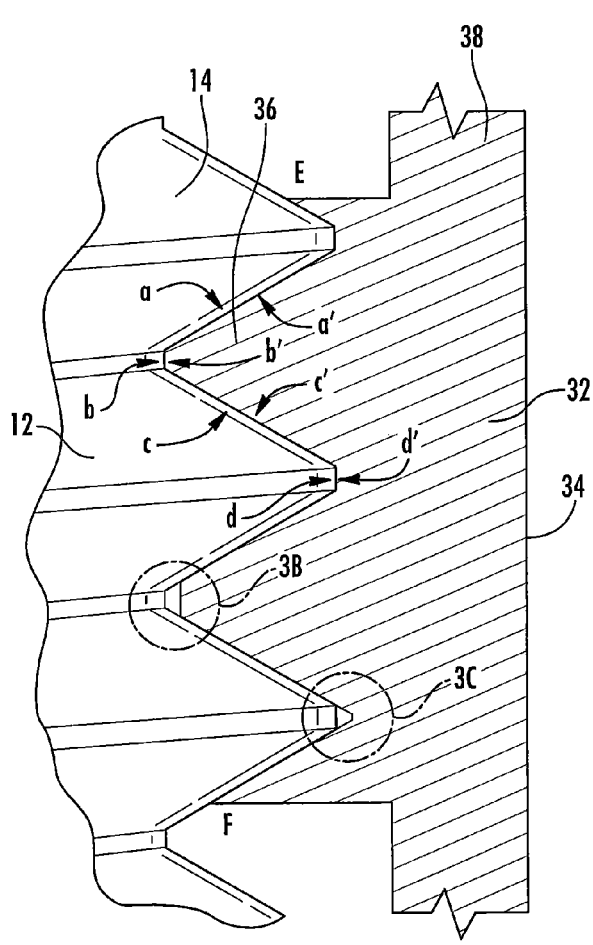
FIG. 3A is a top view of an enlarged top section of the threaded stem and sealing adapter of FIG. 3, wherein undesirable voids between the adapter and the threaded stem are illustrated.
Figure 3B:
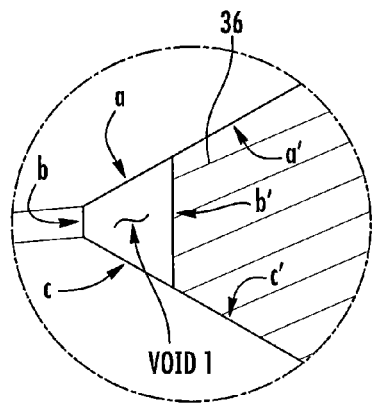
FIG. 3B is a further enlarged top/section view of one of the voids between the threaded stem and the sealing adapter shown in FIG. 3A.
Figure 3C:
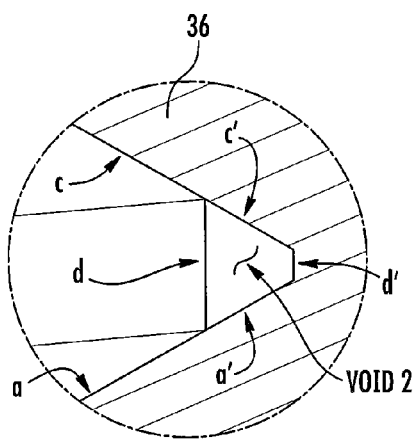
FIG. 3C is a further enlarged top/section view of another of the voids between the threaded stem and the sealing adapter shown in FIG. 3A.

Referring now to FIGS. 3-3C, a sealing adapter, designated broadly at 30, is illustrated therein. The sealing adapter 30 is in the form of a nut that threads onto the threaded surface 14 of a threaded stem 12. The sealing adapter 30 includes an annular body 32 having a relatively smooth outer surface 34 that receives the sealing boot 16 and provides a seal. Threads 36 project radially inwardly from the body 32 and, as described in detail below, and in contrast to typical threads, are sized and configured to provide a seal between the sealing adapter 30 and the threaded stem 12. Wings 38 extend longitudinally from the ends of the body 32 to assist with assembly of the sealing adapter 30 onto the threaded stem 12. Also shown in FIG. 3 is a coaxial cable 40 that is interconnected with the threaded stem 12 via a coupling nut 50 that is associated with a coaxial connector on the coaxial cable 40.

Referring now to FIGS. 3A-3C, the configurations of the threads 36 of the sealing adapter 30, the threads 14 of the threaded stem 12, and their interrelationships are shown in detail. As shown in the figures, reference call-outs are employed as listed in Table 1 below.

More specifically, FIG. 3B shows an enlarged view of a potential defect at the root (or minor) diameter of the male thread 14 of the threaded stem 12. Void 1 is shown therein and is defined by the trapezoid a, b', c and b. Similarly, FIG. 3C shows an enlarged view of a potential defect at the crest (or major) diameter of the male thread 14 of the threaded stem 12. Void 2 is shown therein and is defined by the trapezoid c', d', a' and d.

Consider first the (root) minor diameter b of the male thread 14. The sealing adapter 14 should avoid creating Void 1, as this void would spiral around the circumference of the thread root b, forming a moisture leak path from end to end (i.e., from E to F in FIG. 3A). As such, the minor diameter b' of the sealing adapter 30 should be less than the minor diameter b of the thread 14.

Consider next the (crest) major diameter d of the male thread 14. The sealing adapter 30 should avoid creating Void 2, as this void would spiral around the circumference of the thread crest d, forming a moisture leak path from end to end (again, from E to F in FIG. 3A). As such, the major diameter d' of the sealing adapter 30 should be less than the major diameter d of the thread 14.

Finally, consider the flanks a, c of the "V" thread form of the male thread 14 itself As these surfaces are angled, it is convenient to describe their size as a "pitch diameter," wherein "pitch diameter" is defined as the diameter of an imaginary cylinder drawn along the axis of the thread where equal length is contained inside and outside the thread form. Creation of a void along the flanks a, c should be avoided, as a void at either location would spiral around the circumference of the thread flank, again forming a moisture leak path from end to end. As such, the pitch diameter a', c' of the sealing adapter threads 36 should be less than the pitch diameter a, c of the thread 14 of the threaded stem 12.

An exemplary threaded stem 12 is the M29 thread, typically employed on an antenna, RRH or the like. The dimensions of an M29 thread are shown in Table 2 below.

TABLE 1

Reference Callouts for Thread Locations

| | Reference Callout | | | | | | |
|---|---|---|---|---|---|---|---|
| a | b | c | d | a' | b' | c' | d' |
| Surface Thread flank of male thread 14 of threaded stem | Minor diameter of male thread 14 of threaded stem | Thread flank of male thread 14 of threaded stem | Major diameter of male thread 14 of threaded stem | Thread flank of thread 36 of sealing adapter | Minor diameter of thread 36 of sealing adapter | Thread flank of thread 36 of sealing adapter | Major diameter of thread 36 of sealing adapter |

As stated above, the sealing adapter 30 is used to form a seal between the threaded stem 12 and the sealing boot 16; the sealing adapter 30 forms a watertight seal with the threaded stem 12, and the resulting assembly 15 presents the outer surface 34 of the sealing adapter 30 to engage and form a seal with the sealing boot 16. In order for the sealing adapter 30 to form a water-tight seal on the threads 14 of the threaded stem 12, the sealing adapter 30 makes compressive contact on all surfaces of the thread (a, b, c and d). In other words, compressive contact occurs simultaneously between surfaces: a and a'; b and b', c and c', and d and d' to avoid any voids as shown in FIGS. 3B and 3C.

TABLE 2

Size of typical M29 × 1.5-6 g threads

| M29 × 1.5-6 g | Minor diameter (b) | Pitch diameter (a, c) | Major diameter (d) |
|---|---|---|---|
| limits, mm (rounded) | 27.34 | 27.84/27.99 | 28.73/28.97 |

In view of these dimensions, an appropriate sealing adapter 30 would have a minor diameter b' of less than 27.34 mm, a pitch diameter a', c' of less than 27.84 mm, and a major diameter d' of less than 28.73 mm. These dimensions would be varied for a threaded stem of a different size. Typically, the diametric dimension of the sealing adapter 30 is between about 0.05 mm and 0.20 mm less than that of the corresponding diameter of the threaded stem 12.

The sealing adapter 30 may be formed of various materials, but is typically formed of a polymeric material. The material of choice should have a hardness (for example, a Shore hardness of between about 70-90) that the material can deflect sufficiently to be screwed onto the threaded stem 12, yet provide a seal as desired once in place. An exemplary material is a thermoplastic elastomer (TPE), such as Santoprene™ resin, available from ExxonMobil.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention.

That which is claimed is:

1. An assembly, comprising:
   a threaded stem having an external helical male thread, the male thread defining a root having a first diameter, a crest having a second diameter, and flanks defining a third diameter;
   a sealing adapter having an annular body, an outer surface, and an internal female thread, the female thread defining a crest having a fourth diameter, a root having a fifth diameter, and flanks defining a sixth diameter;
   wherein the sealing adapter is threaded onto the threaded stem such that the female thread engages the male thread, and wherein, prior to assembly, the fourth diameter is less than the first diameter, the fifth diameter is less than the second diameter, and the sixth diameter is less than the third diameter.

2. The assembly defined in claim 1, wherein the fourth diameter is between about 0.05 mm and 0.20 mm less than the first diameter.

3. The assembly defined in claim 1, wherein the fifth diameter is between about 0.05 mm and 0.20 mm less than the second diameter.

4. The assembly defined in claim 1, wherein the sixth diameter is between about 0.05 mm and 0.20 mm less than the third diameter.

5. The assembly defined in claim 4, wherein the fourth diameter is between about 0.05 mm and 0.20 mm less than the first diameter, and wherein the fifth diameter is between about 0.05 mm and 0.20 mm less than the second diameter.

6. The assembly defined in claim 1, wherein the sealing adapter is formed of a polymeric material.

7. The assembly defined in claim 6, wherein the sealing adapter is formed of TPE.

8. The assembly defined in claim 1, further comprising a sealing boot that engages the outer surface of the sealing adapter.

9. The assembly defined in claim 8, further comprising a coaxial cable interconnected with the threaded stem.

10. An assembly, comprising:
    a threaded stem having an external helical male thread, the male thread defining a root having a first diameter, a crest having a second diameter, and flanks defining a third diameter;
    a sealing adapter having an annular body, an outer surface, and an internal female thread, the female thread defining a crest having a fourth diameter, a root having a fifth diameter, and flanks defining a sixth diameter;
    wherein the sealing adapter is threaded onto the threaded stem such that the female thread engages the male thread, and wherein the first, second, third, fourth, fifth and sixth diameters are selected so that the sealing adapter forms a watertight seal with the threaded stem.

11. The assembly defined in claim 10, wherein, prior to assembly, the fourth diameter is less than the first diameter, the fifth diameter is less than the second diameter, and the sixth diameter is less than the third diameter.

12. The assembly defined in claim 10, wherein the fourth diameter is between about 0.05 mm and 0.20 mm less than the first diameter.

13. The assembly defined in claim 10, wherein the fifth diameter is between about 0.05 mm and 0.20 mm less than the second diameter.

14. The assembly defined in claim 10, wherein the sixth diameter is between about 0.05 mm and 0.20 mm less than the third diameter.

15. The assembly defined in claim 14, wherein the fourth diameter is between about 0.05 mm and 0.20 mm less than the first diameter, and wherein the fifth diameter is between about 0.05 mm and 0.20 mm less than the second diameter.

16. The assembly defined in claim 10, wherein the sealing adapter is formed of a polymeric material.

17. The assembly defined in claim 16, wherein the sealing adapter is formed of TPE.

18. The assembly defined in claim 10, further comprising a sealing boot that engages the outer surface of the sealing adapter.

19. The assembly defined in claim 18, further comprising a coaxial cable interconnected with the threaded stem.

20. An assembly, comprising:
    a threaded stem having an external helical male thread, the male thread defining a root having a first diameter, a crest having a second diameter, and flanks defining a third diameter;
    a sealing adapter having an annular body, an outer surface, and an internal female thread, the female thread defining a crest having a fourth diameter, a root having a fifth diameter, and flanks defining a sixth diameter;
    wherein the sealing adapter is threaded onto the threaded stem such that the female thread engages the male thread, and wherein the first, second, third, fourth, fifth and sixth diameters are selected so that the male thread of the threaded stem and the female thread of the sealing adapter experience full compressive contact.

* * * * *